(12) United States Patent
Cubizolle

(10) Patent No.: US 8,104,335 B2
(45) Date of Patent: Jan. 31, 2012

(54) METHOD AND DEVICE FOR MEASURING A TIRE INFLATION PRESSURE BY MEANS OF A STRESS SENSOR

(75) Inventor: Bernard Cubizolle, Cebazat (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 914 days.

(21) Appl. No.: 12/088,918

(22) PCT Filed: Oct. 3, 2006

(86) PCT No.: PCT/EP2006/067001
§ 371 (c)(1),
(2), (4) Date: Apr. 1, 2008

(87) PCT Pub. No.: WO2007/039608
PCT Pub. Date: Apr. 12, 2007

(65) Prior Publication Data
US 2008/0251173 A1    Oct. 16, 2008

(30) Foreign Application Priority Data
Oct. 6, 2005 (FR) ................................. 05 10294

(51) Int. Cl.
*G01M 17/02* (2006.01)
(52) U.S. Cl. ........................................... 73/146

(58) Field of Classification Search .................. None
See application file for complete search history.

(56) References Cited

U.S. PATENT DOCUMENTS

| 5,517,853 | A * | 5/1996 | Chamussy | 73/146.3 |
| 2005/0030170 | A1 * | 2/2005 | Rieck et al. | 340/443 |
| 2008/0245459 | A1 * | 10/2008 | Miyoshi | 152/450 |
| 2009/0320580 | A1 * | 12/2009 | Mancosu et al. | 73/146 |
| 2010/0307656 | A1 * | 12/2010 | Honneur | 152/548 |
| 2011/0083782 | A1 * | 4/2011 | Fujita | 152/541 |

FOREIGN PATENT DOCUMENTS

| EP | 0 937 615 A2 | 8/1999 |
| EP | 1 293 362 A2 | 3/2003 |
| FR | 2 771 965 | 6/1999 |

* cited by examiner

*Primary Examiner* — Andre Allen
(74) *Attorney, Agent, or Firm* — Fitzpatrick, Cella, Harper & Scinto

(57) ABSTRACT

A method for measuring inflation pressure of a vehicle tire involves measuring a compressive stress. The tire includes a rubber mass, referred to as an interior rubber, delimited by an internal surface in contact with air inside the tire and an external surface in contact with a carcass ply of the tire. The compressive stress in the interior rubber of the tire, between the internal and external surfaces of the interior rubber, is measured and the inflation pressure is deduced from this compressive stress.

5 Claims, 1 Drawing Sheet

Figure 1:
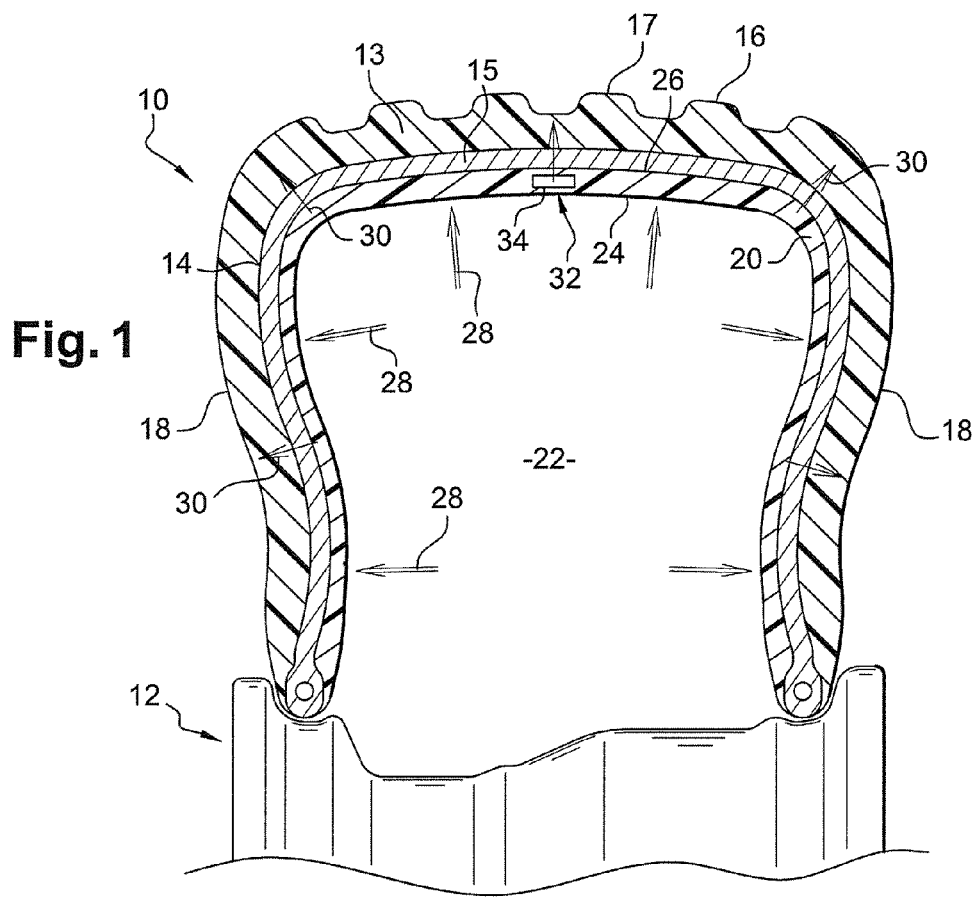

METHOD AND DEVICE FOR MEASURING A TIRE INFLATION PRESSURE BY MEANS OF A STRESS SENSOR

The present invention relates to a method for measuring inflation pressure of a vehicle tire as well as to a tire that includes a sensor.

The invention relates more particularly to the pressure measurement of a tire of the "tubeless" type (that is, without an inner tube), which includes a rubber mass, also known as an interior rubber, delimited by an internal surface in contact with the air inside the tire and an external surface in contact with a carcass ply of the tire.

The invention also applies to the case of a tire known as a "tube type" intended to be used with an inner tube. In this case, the inner tube plays the role of the interior rubber.

The measurement of the inflation pressure of a tire when stationary is known in the prior art, such as by means of a manometer. The invention relates more particularly to methods for making it possible to measure the inflation pressure of a tire while rolling.

A first known method consists in measuring deformations of the tire, in particular at the level of the area of contact with the ground, so as to deduce the inflation pressure therefrom. This method uses the fact that the length of the contact area varies as a function of the pressure of the tire and the load that it supports.

By measuring in the course of a wheel revolution the deformations undergone or experienced by the tire, it is possible to obtain an estimate of the length of the contact area. Knowing the length of the contact area makes it possible to deduce the deflection of the tire. Knowing the deflection and the load makes it possible ultimately to obtain an estimate of the inflation pressure of the tire.

On account of intermediate calculation steps that include, approximations, the pressure value estimated by this method is generally not very accurate.

A second method known from the prior art consists in integrating on the tire or on the wheel a pressure sensor able to measure the pressure prevailing inside the tire.

The problem nevertheless arises in fixing or attaching the pressure sensor on the wheel or on the tire. Specifically, during fast rotation of the tire, the pressure sensor is subjected to very high forces, which weaken its attachment. It is therefore necessary to use robust, voluminous, unwieldy, and expensive means for fixing the sensor.

Furthermore, the presence of water inside the tire is generally noted. The pressure sensor might thus be in contact with the water, which has the effect of accelerating its corrosion.

The aim of the invention is to solve the measurement uncertainty problems of the first method and the sensor fixing and corrosion problems of the second method.

For this purpose, an aspect of the invention is a method for measuring the inflation pressure of a vehicle, which involves using a rubber mass, also referred to as an interior rubber, delimited by an internal surface in contact with the air inside the tire and an external surface in contact with a carcass ply of the tire, wherein a compressive stress in the interior rubber of the tire, between the internal and external surfaces of the interior rubber, is measured and the inflation pressure is deduced from this stress.

This invention runs counter to the preconception according to which the stresses exerted inside the rubber of a tire result from the aggregate effect of the pressure of the load and of various shear loadings appearing in particular during phases of acceleration or deviation of the tire.

The inventors have indeed noted that in the interior rubber the compressive stress between the internal and external surfaces of the interior rubber is substantially equal to the inflation pressure of the tire. The compressive stress at a point of the interior rubber corresponds to the stress that is exerted in a direction substantially normal to the internal surface of the interior rubber. The normal direction is defined by the straight line passing through the point where the stress is measured and by the orthogonal projection of this point onto the internal surface of the interior rubber.

By virtue of this method, the value of the inflation pressure of the tire is obtained by direct measurement of a compressive stress, limiting or minimizing as far as possible the calculations that generally include approximations.

As this method allows the measurement of a quantity in the interior rubber, which constitutes an airtight mass, it is possible to place a sensor in this airtight mass in order to measure the stress. The sensor thus placed is fixed solidly to the interior rubber and is sheltered from the water that may be in the tire.

A measurement method according to the invention can furthermore include one or more of the following characteristics:
the compressive stress of the interior rubber is measured in a part of this rubber overlapped by the tread; the inventors have noted that the stress measured in this part of the rubber constitutes a very good estimate of the pressure of the tire;
the compressive stress of the interior rubber is measured in the middle of the width of the tire;
the compressive stress is measured several times in the course of at least one revolution of the tire and a mean is calculated of the stress values obtained, which are not influenced by contact of the tire with the ground. During transit through the contact area, the stress measurements undergo disturbances; it is therefore preferable to estimate the pressure of the tire using stress measurements that are not influenced by a transit through the contact area.

It should be noted that the interior rubber can be a tire inner tube, if the tire is intended to be used with an inner tube.

The subject of the invention is also a vehicle tire that includes a rubber mass, referred to as an interior rubber, delimited by an internal surface in contact with the air inside the tire and an external surface in contact with a carcass ply of the tire. The tire includes a sensor having a stress application surface that is in contact with the interior rubber so as to be subjected to a compressive stress of the interior rubber between its internal and external surfaces.

A vehicle tire according to the invention can furthermore have one or more of the following characteristics:
the stress application surface is arranged in a part of the interior rubber overlapped by the tread;
the stress application surface is arranged in the middle of the width of the tire;
the stress application surface of the sensor is embedded in the interior rubber. It is particularly advantageous to embed the sensor in the interior rubber by integrating it with the tire during its manufacture. Once the sensor is embedded in the interior rubber, its fixing to the tire is particularly robust. Moreover, the sensor thus embedded is sheltered from water that stagnates in the tire;
the stress application surface of the sensor is in contact with the external surface of the interior rubber. To embed the sensor in the interior rubber, it suffices to integrate it with the tire when assembling the various components, for example between a thin band of rubber constituting the interior rubber and the carcass ply, in such a manner that the application surface of the sensor is in contact with the external surface of the interior rubber. During integration of the sensor, it is preferable to orient it so that it is possible to measure the compressive stress alone, that is, so that the application surface of the sensor is orthogonal to the compressive stress;

the sensor is a pressure sensor.

Another aspect of the invention is directed to a tire and an inner tube assembly in which the interior rubber is a tire inner tube, the tire being intended to be used with this inner tube.

Figure 2:
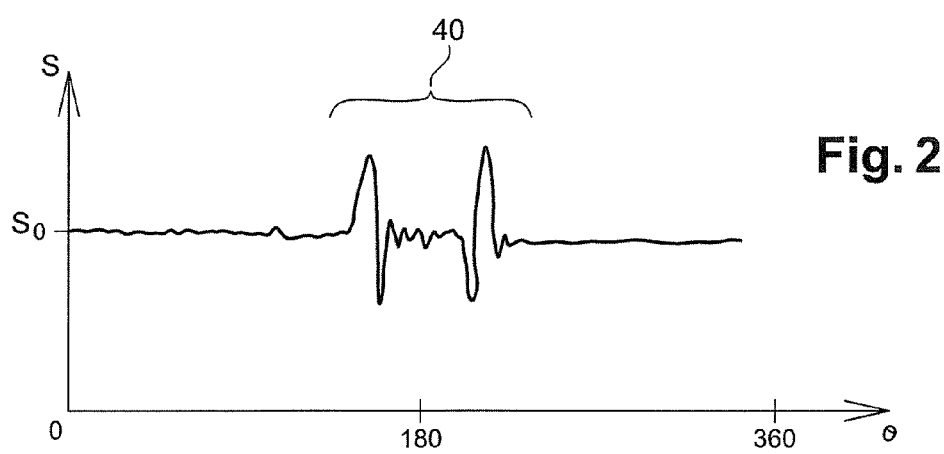

The invention will be better understood upon reading the following description, which is given solely by way of example, while referring to the appended drawings, in which:

FIG. 1 is a diagram showing an axial section through a mounted assembly of a wheel and a tire, according to an embodiment of the invention, and FIG. 2 is a graph representing a signal provided by a sensor embedded in the tire of FIG. 1, in the course of a revolution of the tire.

Represented in FIG. 1 is a tire, denoted generally by reference numeral 10, mounted on a wheel 12.

The tire 10 includes a first rubber mass 13, also referred to as an exterior rubber, which has an internal surface 14 in contact with a carcass ply 15 and an external surface 16 in contact with the air outside the tire. The external surface 16 of the exterior rubber 13 forms a tread 17 and two sidewalls 18.

The carcass ply 15 separates the first rubber mass 13 from a second rubber mass, also referred to as an interior rubber 20. The tire 10 represented in FIG. 1 is a tubeless type of tire (that is, without an inner tube), in which the interior rubber 20 is impermeable to air and ensures the airtightness of the tire 10.

The interior rubber 20 is delimited by an internal surface 24 in contact with the air inside the tire 10 and an external surface 26 in contact with the carcass ply 15.

The internal surface 24 delimits a cavity 22 of the tire 10 inside which the air is imprisoned or trapped. The interior rubber 20 is thin, such that the internal 24 and external 26 surfaces are substantially a constant distance apart.

As the air imprisoned in the cavity 22 is pressurized, it exerts on the interior rubber 20 a force uniformly distributed over its internal surface 24. This force is symbolized in FIG. 1 by double-arrows 28, locally orthogonal to the internal surface 24.

The force exerted by the pressure of the air imprisoned in the cavity 22 of the tire 10 has the effects of compressing the interior rubber 20 and of displacing the internal surface 24 towards the external surface 26, locally in a direction normal to the internal surface 24. These displacements have the effect of creating locally, in the interior rubber 20, stresses termed "compressive" in a direction normal to the internal 24 and external 26 surfaces. These stresses are symbolized in FIG. 1 by single arrows 30.

The tire 10 includes a sensor 32, which in the example of this discussion is a pressure sensor 32 embedded in the interior rubber 20.

This pressure sensor 32 includes a stress application surface 34, which is in contact with the interior rubber 20. In the example of this discussion, the stress application surface 34 is embedded in the interior rubber; however, this surface could be situated between the carcass ply 15 and the external surface 26 of the interior rubber 20.

Moreover, the stress application surface 34 is disposed so as to be subjected to a compressive stress of the interior rubber 20 between its internal 24 and external 26 surfaces. For this purpose, the sensor 32 is oriented so that its application surface 34 is orthogonal to the stresses exerted in the interior rubber 20, that is, the application surface 34 is parallel to the internal surface 24.

Preferably, as represented in FIG. 1, the stress application surface 34 is arranged in a part of the interior rubber 20 overlapped by the tread 17, substantially in the middle of the width of the tire 10.

The inventors have noted that the value of the stress measured by the pressure sensor 32 is substantially equal to the value of the pressure prevailing inside the cavity 22 of the tire 10. Thus, it is possible to consider that the interior rubber transmits almost perfectly the stresses exerted on its internal surface 24 by the pressure of the air prevailing in the cavity 22.

It is particularly important that the sensor be oriented so as to measure only a compressive stress that is hardly or minimally influenced other than by the pressure of the air of the cavity. A slight inclination of the sensor with respect to its optimal position has the effect that the measured stress values are equal to the value of the pressure in the tire to within a bias. Specifically, if the sensor is not correctly positioned, it might be influenced by other stresses of the interior rubber 20, which result for example from the shearing of the tire.

The method of measuring an inflation pressure of the tire 10 according to an aspect of the invention then includes measuring a compressive stress, at a point of the interior rubber 20 of the tire 10, between the internal 24 and external 26 surfaces of the interior rubber 20, and in deducing the inflation pressure from this stress. The stress measurement is obtained by means of the pressure sensor 32.

Represented in FIG. 2 is the evolution of a signal provided by the pressure sensor 32 in the course of a revolution of a tire rolling on the ground. A characteristic zone 40 is very markedly distinguished on this graph. This characteristic zone 40 corresponds to an angular interval in which the pressure sensor 32 is influenced by contact of the tire with the ground. Measurements have shown that this angular interval is of the order of 30 to 60 degrees depending on the load and pressure conditions and in particular on the length of the contact area.

Outside of this characteristic angular interval 40, the signal measured as output from the pressure sensor 32 is substantially constant and evolves about a value substantially equal to the pressure prevailing in the tire. Consequently, it is advantageous to measure the compressive stress several times in the course of at least one revolution of the tire 10 and to calculate a mean of the stress values obtained that are not influenced by contact of the tire with the ground. A more accurate and more reliable value of the pressure in the tire is thus obtained.

The characteristic angular span can be used to estimate the length of the contact area and to deduce therefrom the deflection of the tire or the load that it supports. These calculations are conventional and have been described in numerous publications in the prior art.

Finally, it will be noted that the invention is not limited to the embodiments described above.

In particular, it will be possible to use any type of sensor other than a pressure sensor, which makes it possible to provide a measurement of a compressive stress, in the interior rubber of the tire, between the internal and external surfaces of the interior rubber, in particular a stress sensor.

The invention claimed is:

1. A method for measuring an inflation pressure of a vehicle tire that includes an interior rubber mass, delimited by an internal surface in contact with air inside the vehicle tire and an external surface in contact with a carcass ply of the vehicle tire, the method comprising:

measuring compressive stress values in the interior rubber mass between the internal and external surfaces of the interior rubber mass, wherein the measuring is performed using a sensor, which is located on or in the interior rubber mass, while the vehicle tire is rolling on a ground surface, and wherein the compressive stress values include (1) measured compressive stress values within a zone corresponding to an angular interval in which the sensor is influenced by contact of the vehicle tire with the ground surface, and (2) measured compressive stress values outside of the zone corresponding to the angular interval in which the sensor is influenced by contact of the vehicle tire with the ground surface; and obtaining the inflation pressure from the measured compressive stress values outside of the zone corresponding to the angular interval in which the sensor is influenced by contact of the vehicle tire with the ground surface.

2. A method according to claim 1, wherein the compressive stress values of the interior rubber mass are measured in a part of the interior rubber mass that overlaps a tread of the vehicle tire.

3. A method according to claim 1, wherein the compressive stress values of the interior rubber mass are measured in a middle portion along a width of the vehicle tire.

4. A method according to any one of claims 1 to 3, wherein, when the vehicle tire is rolling on the ground surface, the compressive stress values are measured several times in a course of at least one revolution of the vehicle tire and a mean is calculated of the measured compressive stress values outside of the zone corresponding to the angular interval in which the sensor is influenced by contact of the vehicle tire with the ground surface.

5. A method according to any one of claims 1 to 3, wherein the interior rubber mass is a tire inner tube, if the vehicle tire is intended to be used with an inner tube.

\* \* \* \* \*